United States Patent
Wu

(10) Patent No.: US 11,667,313 B2
(45) Date of Patent: Jun. 6, 2023

(54) FOLDABLE FRAME FOR A CART

(71) Applicant: Peiwu Wu, Anhui (CN)

(72) Inventor: Peiwu Wu, Anhui (CN)

( * ) Notice: Subject to any disclaimer, the term of this patent is extended or adjusted under 35 U.S.C. 154(b) by 0 days.

(21) Appl. No.: 17/557,004

(22) Filed: Dec. 20, 2021

(65) Prior Publication Data

US 2023/0049293 A1  Feb. 16, 2023

(30) Foreign Application Priority Data

Aug. 16, 2021 (CN) .......................... 202121913091.X

(51) Int. Cl.
*B62B 3/00* (2006.01)
*B62B 5/06* (2006.01)

(52) U.S. Cl.
CPC .............. *B62B 3/007* (2013.01); *B62B 5/067* (2013.01); *B62B 2202/52* (2013.01); *B62B 2205/06* (2013.01); *B62B 2205/121* (2013.01); *B62B 2205/24* (2013.01)

(58) Field of Classification Search
CPC ... B62B 3/007; B62B 5/067; B62B 2202/552; B62B 2205/06; B62B 2205/121; B62B 2205/24
See application file for complete search history.

(56) References Cited

U.S. PATENT DOCUMENTS

| | | | |
|---|---|---|---|
| 2,049,683 A * | 8/1936 | Baumgardner | B62B 3/02 248/129 |
| 10,272,937 B2 * | 4/2019 | Chen | B62B 5/0003 |
| 10,435,055 B1 * | 10/2019 | Zhu | B62B 3/007 |
| 10,836,418 B2 * | 11/2020 | Zhu | B62B 3/025 |
| 10,953,904 B1 * | 3/2021 | Sun | B62B 3/002 |
| 11,247,708 B2 * | 2/2022 | Wang | B62B 3/025 |
| 2018/0327011 A1 * | 11/2018 | Horowitz | B62B 5/067 |
| 2020/0283046 A1 * | 9/2020 | Wu | B62B 3/007 |
| 2021/0107548 A1 * | 4/2021 | Wang | B62B 3/007 |
| 2021/0300450 A1 * | 9/2021 | Yang | B62B 5/067 |

FOREIGN PATENT DOCUMENTS

GB          585540 A *  8/1936  .............. B25H 1/04

* cited by examiner

*Primary Examiner* — Steve Clemmons

(57) ABSTRACT

This utility model discloses a foldable frame for a cart, including the front wheel unit part, the rear wheel unit part, the side-wall connection structure, the scissor structure I, the scissor structure II, the bottom support structure. The said scissor structure I is movable-connected on the front wheel unit part, and both the said scissor structure II and the scissor structure I have the same structure and are connected on the rear wheel unit part. Two groups of the said side-wall connection structure are provided and they are respectively connected on the front wheel unit part and the rear wheel unit part on the same side. Totally, the said bottom support structure are movable-connected to two groups of the said front wheel unit part and the rear wheel unit part. This utility model belongs to the technology field of the frame for a cart.

5 Claims, 3 Drawing Sheets

FOLDABLE FRAME FOR A CART

BACKGROUND OF THE INVENTION

This utility model belongs to the technology field of the frame and specially denotes to a type of foldable frame for a cart.

Currently, the marketed carts are mainly in the plain-folding form and they are big in folded volume and unable to directly stand and inconvenient in placement. For weight-bearing, their bearing bottom frame uses the telescopes, and during the use course, their wheels are unstable so as to result in an inner V-shape or an external V-shape. Or a dual-bottom frame structure is used and the bottom is poor in bearing performance due to excessive connections. And more, the structure is excessively complex and the integral appearance is poor.

BRIEF SUMMARY OF THE INVENTION

In order to eliminate the above-mentioned difficulties, this utility model provides a type of foldable frame for a cart.

In order to realize the above-mentioned functions, this utility model adopts the following technical scheme. It involves with a type of foldable frame for a cart and the frame includes the front wheel unit part, the rear wheel unit part, the side-wall connection structure, the scissor structure I, the scissor structure II, the bottom support structure, the tie rod and the tie rod connection support structure. Totally, two groups of the front wheel unit part and the rear wheel unit part are provided and they have the same structure. The said front wheel unit part includes the column, the wheel clamp, the sliding sleeve and the moving wheel. The said moving wheel is rotary-set at the bottom of the wheel clamp, and the said column is set at the top of the wheel clamp. The said sliding sleeve is slide-set at the column, the bottom end of the said scissor structure I is hinged at the bottom of the column, and the top of the said scissor structure I is hinged at the sliding sleeve. The said scissor structure II and the scissor structure I have the same structure and are connected at two groups of the said rear wheel unit part. Two groups of the said side-wall connection structure are set and they are respectively set at the front wheel unit part and the rear wheel unit part by the same side. The said bottom support structure is movable-connected on two groups of the said front wheel unit part and rear wheel unit part. The said tie rod connection support structure is rotary-set at the column of two groups of the said front wheel unit part. The said tie rod is set at the tie rod connection support structure and it controls the lateral expansion of the frame through the scissor structure I and the scissor structure II. The side-wall connection structure controls the longitudinal expansion of the frame. The bottom support structure controls the expansion and the folding of the frame and plays a support role.

Preferentially, the said side-wall connection structure includes the connection rod I, the connection rod II, the connection rod III, the connection rod IV, the scissor structure III, the support connector I and support connector II. One end of the said connection rod I is hinged at the top of the column of the rear wheel unit part and the other end of the said connection rod I is hinged at one end of the top of the scissor structure III. One end of the said connection rod II is hinged at the top of the column of the front wheel unit part and the other end of the said connection rod II is hinged at the other end of the top of the scissor structure III. One end of the said connection rod III is hinged at the sliding sleeve of the rear wheel unit part, and the other end of the said connection rod III is hinged at one end of the bottom of the scissor structure III. One end of the said connection rod IV is hinged at the sliding sleeve of the front wheel unit part and the other end of the said connection rod IV is hinged at the other end of the bottom of the scissor structure III. One end of the said support connector I is hinged at the bottom of the column of the rear wheel unit part and the other end of the said support connector I is hinged at the upper end of the scissor structure III. One end of the said support connector II is hinged at the bottom of the column of the front wheel unit part. The other end of the said support connector II is hinged at the upper end of the scissor structure III. When the frame expands, the scissor structure III expands, the connection rod I, the connection rod II, the connection rod III and the connection rod IV expand and make adjustment with the expansion of the scissor structure III so as to keep both the connection rod I and the connection rod II at good level. The support connector I and the support connector II bear the expanded scissor structure III.

Preferentially, the said bottom support structure includes the bottom frame support part and the tie rod V. Totally, 4 groups of the said tie rod V are provided and one ends of the 4 groups of the said tie rod V are respectively hinged at four corners of the bottom frame support part and the other ends of 4 groups of the said tie rod V are respectively hinged at the bottom ends of the column of the front wheel unit part and the rear wheel unit part. At folding, upwards pulling the bottom frame support part will make the tie rod V deflect so as to force the front wheel unit part and the rear wheel unit part close to the bottom frame support part and in turn fold the frame. For expansion, downwards pressing the bottom frame support part will make the tie rod V deflect so as to force the front wheel unit part and the ear wheel unit part depart from the bottom frame support part and in turn laterally and horizontally expand the frame.

Preferentially, the said tie rod connection support structure includes tie rod connector, support tube and tie rod support connector. Two groups of the said support tubes are provided and one end of the two groups of the said support tube are respectively hinged at both ends of the tie rod connector. The said tie rod support connector is rotary-set at the terminal of the support tube. The said tie rod support connector is rotary-set at the bottom of the column of the front wheel unit part and the said tie rod support connector is set in corresponding to the support tube. When the frame is expanded, upwards lifting the tie rod support connector will horizontally straighten the support tube, and when the frame is folded downwards compressing the tie rod support connector will deflect and fold the support tube.

Preferentially, the said tie rod includes the external tie rod, the tie rod sleeve, the internal tie rod, the internal tie rod plug, the limit sheet and the handle. The said external tie rod is set at the tie rod connector and the sidewall at top of the said external tie rod is provided with the through-hole I and the projection column. The said projection columns are set at both sides of the through-hole I, and the sidewall of the said tie rod sleeve is provided with a reverse buckle matched with the projection column. Through the coordination of the reverse buckle with the projection column, the said tie rod sleeve is inserted at the top of the external tie rod. The sidewall of the said tie rod sleeve sidewall is provided with a compression spring sheet matched with the through-hole I. The bottom end of the said internal tie rod is slide-set inside the external tie rod. Totally, two groups of the said limit sheet are provided and they are set at the bottom of the internal tie rod. The said internal tie rod plug is set at the bottom end of the internal tie rod. The sidewall of the said internal tie rod plug is provided with the through-hole II matched with through-hole I. The inside of the said internal tie rod plug is provided with the pellet head and the spring. The said spring is set at the sidewall of the internal tie rod plug and the other end of the said pellet head is set at the terminal of the spring. The said pellet head is set in matching with the through-hole II and the said handle is set at the top of the internal tie rod. For expanding the tie rod, pulling the internal tie rod will make the internal tie rod extract from the external tie rod. When the limit sheet touches the tie rod sleeve, the spring will force the pellet head eject, pass the through-hole II and insert the pellet head in the through-hole I so as to interlock the internal tie rod with the external tie rod. For retraction of the tie rod, downwards pressing the compression spring sheet will force the pellet head push-out from the through-hole I, i.e. retracting the internal tie rod to the external tie rod.

Preferentially, the said tie rod V is able to rotate within 0~90° range to make the tie rod V rotate to a perfect level state so as to expand the frame.

After taking the above-mentioned structures, this utility model obtains the following useful effects: this utility model provides a type of foldable frame for a cart, which is simple in structure and reasonable in design. Merely upwards pulling the bottom frame support part will make the tie rod V rotate, i.e. fold the frame. For expansion, merely downwards compressing the bottom frame support part will expand the frame, and the operation is convenient. The telescopic design of the tie rod will satisfy the demands of many people.

where, 1. front wheel unit part, 2. rear wheel unit part, 3. side-wall connection structure, 4. scissor structure I, 5. scissor structure II, 6. bottom support structure, 7. tie rod, 8. tie rod connection support structure, 9. column, 10. wheel clamp, 11. sliding sleeve, 12. moving wheel, 13. the connection rod I, 14. the connection rod II, 15. the connection rod III, 16. connection rod IV, 17. scissor structure III, 18. support connector I, 19. support connector II, 20. bottom frame support part, 21. tie rod V, 22. tie rod connector, 23. support tube, 24. tie rod support connector, 25. external tie rod, 26. tie rod sleeve, 27. internal tie rod, 28. internal tie rod plug, 29. limit sheet, 30. handle, 31. through-hole I, 32. projection column, 33. compression spring sheet, 34. through-hole II, 35. pellet head, 36. spring, 37. reverse buckle

DETAILED DESCRIPTION OF THE INVENTION

In the following pages, the technical scheme of this utility model will be further detailed in combination with implementation examples. The technical characters or connection relationships which are not detailed herein are the ones which are adopted in the prior technology.

It is to be understood that in the description of this utility model the term "horizontal", "lateral", "upper", "down", "front", "rear", "left", "right", "vertical", "level", "top", "bottom", "inside", and "outside" which indicate the position or the position relationship is the position or the position relationship indicated on basis of the attached diagrams and they are for facilitating description of this utility model and simplifying the description, instead of indicating or implying the specific positions which the pointed device or element ought to have and which shall have the specific structure and be operated in the specific structure, and hence they shall not be understood to restrict this utility model.

In the following pages, this utility model is further detailed in combination with the attached diagrams.

Figure 1:
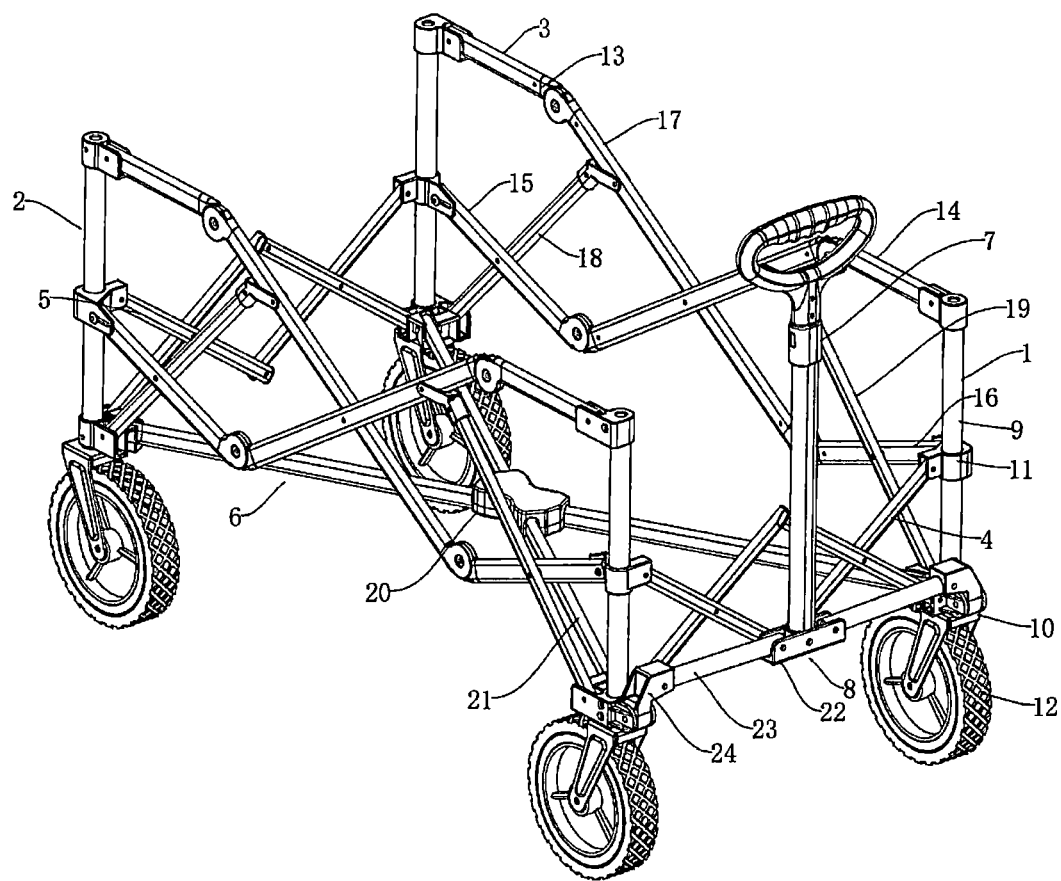
FIG. 1 is the schematic diagram of the expanded structure of a type of foldable frame for a cart in this utility model.
Figure 2:
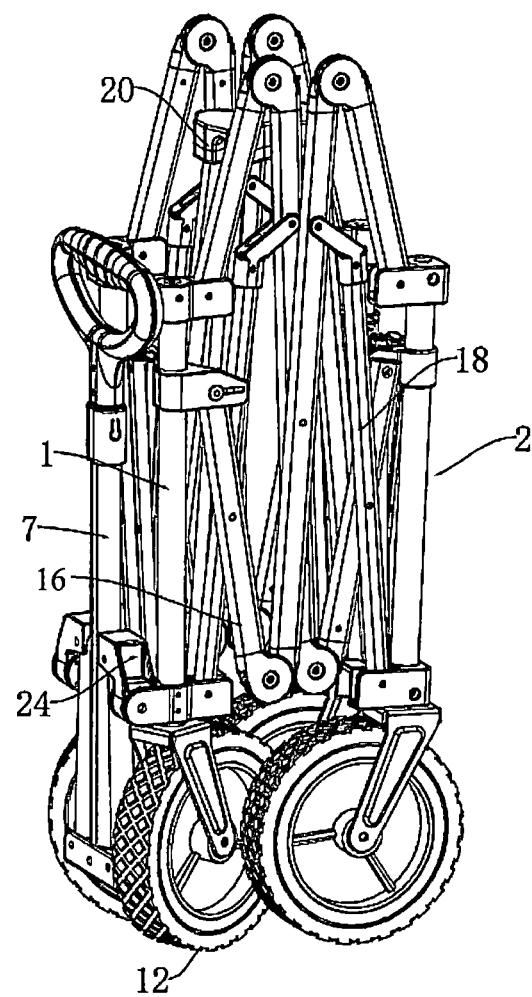
FIG. 2 is the schematic diagram of the folded structure of a type of foldable frame for a cart in this utility model.
Figure 3:
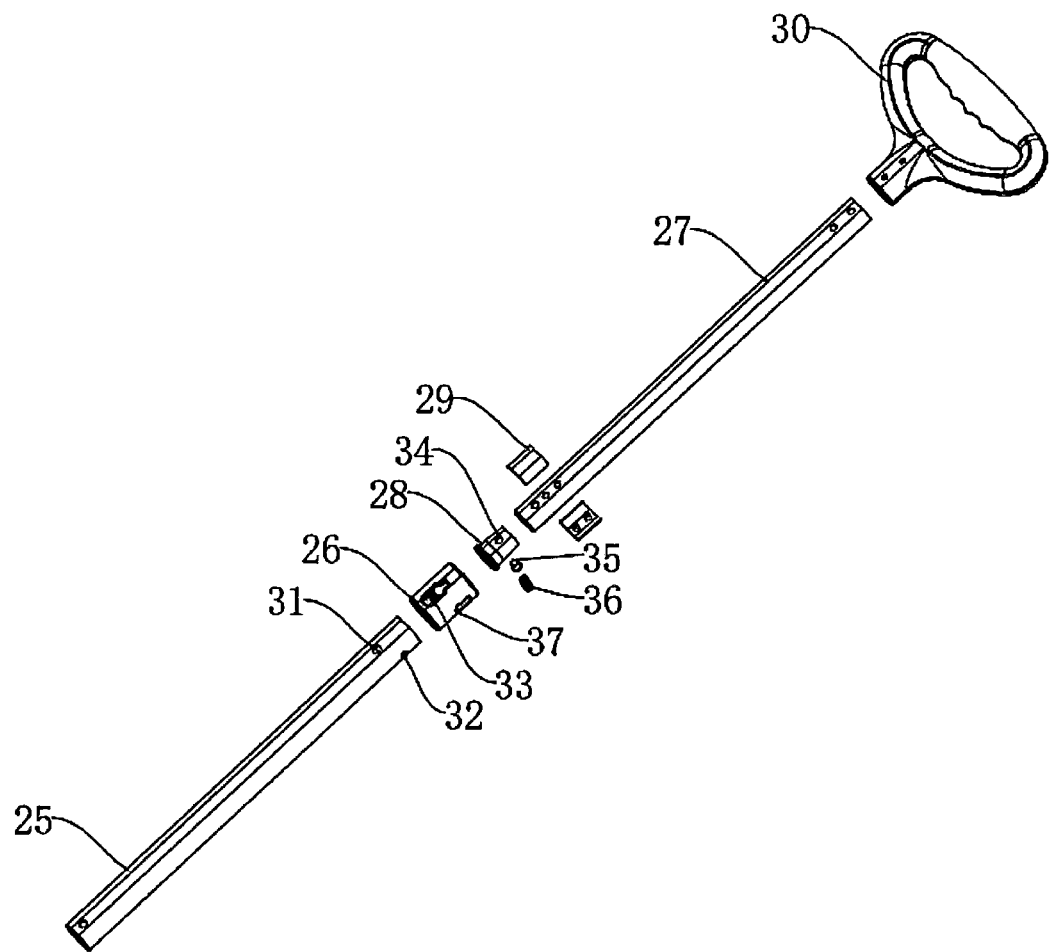
FIG. 3 is the exposition view of a type of foldable frame for a cart in this utility model.

As shown in FIG. 1-3, a type of foldable frame for a cart includes front wheel unit part 1, rear wheel unit part 2, sidewall connection structure 3, scissor structure I 4, scissor structure II 5, bottom support structure 6, tie rod 7 and tie rod connection support structure 8. Totally, two groups of front wheel unit part 1 and rear wheel unit part 2 are set and they have the same structure. Front wheel unit part 1 includes column 9, wheel clamp 10, sliding sleeve 11 and moving wheel 12. Moving wheel 12 is rotary-set at the bottom of wheel clamp 10. Column 9 is set at the top of wheel clamp 10. Sliding sleeve 11 is slide-set at column 9 and the bottom end of scissor structure I 4 is hinged at the bottom of column 9. The top of scissor structure I 4 is hinged at sliding sleeve 11. Scissor structure II 5 and scissor structure I 4 have the same structure and are connected at two groups of rear wheel unit part 2. Totally, two groups of side-wall connection structure 3 are respectively set at the same side of front wheel unit part 1 and rear wheel unit part 2. Bottom support structure 6 is movable-connected on two groups of front wheel unit part 1 and rear wheel unit part 2. Tie rod connection support structure 8 is rotary-set at column 9 of two groups of front wheel unit part 1. Tie rod 7 is set at tie rod connection support structure 8.

Side-wall connection structure 3 includes connection rod I 13, connection rod II 14, connection rod III 15, connection rod IV 16, scissor structure III 17, support connector I 18 and support connector II 19. One end of connection rod I 13 is hinged at the top of column 9 of rear wheel unit part 2. The other end of connection rod I 13 is hinged at one end of the top of scissor structure III 17. One end of connection rod II 14 is hinged at the top of column 9 of front wheel unit part 1 and the other end of connection rod II 14 is hinged at the other end of the top of scissor structure III 17. One end of connection rod III 15 is hinged at sliding sleeve 11 of wheel unit part 2 and the other end of connection rod III 15 is hinged at one end of the bottom of scissor structure III 17. One end of connection rod IV 16 is hinged at sliding sleeve 11 of front wheel unit part 1 and the other end of connection rod IV 16 is hinged at the other end of the bottom of scissor structure III 17. One end of support connector I 18 is hinged at the bottom of column 9 of rear wheel unit part 2 and the other end of support connector I 18 is hinged at the upper end of scissor structure III 17. One end of support connector II 19 is hinged at the bottom of column 9 of front wheel unit part 1 and the other end of support connector II 19 is hinged at the upper end of scissor structure III 17.

Bottom support structure 6 includes bottom frame support part 20 and tie rod V 21. Totally, 4 groups of tie rod V 21 are set. One end of 4 groups of tie rod V 21 are respectively hinged at the 4 corners of bottom frame support part 20 and the other end of the 4 groups of tie rod V 21 are respectively hinged at the bottom end of column 9 of front wheel unit part 1 and rear wheel unit part 2.

Tie rod connection support structure 8 includes tie rod connector 22, support tube 23 and tie rod support connector 24. Totally, two groups of support tube 23 are provided. One end of two groups of support tube 23 are respectively hinged at the both ends of tie rod connector 22. Tie rod support connector 24 is rotary-set at the terminal of support tube 23. Tie rod support connector 24 is rotary-set at bottom of column 9 of front wheel unit part 1, and tie rod support connector 24 is set at the position corresponding to support tube 23.

Tie rod 7 includes external tie rod 25, tie rod sleeve 26, internal tie rod 27, internal tie rod plug 28, limit sheet 29 and handle 30. External tie rod 25 is set at tie rod connector 22. The sidewall at top of the said external tie rod 25 is provided with the through-hole I 31 and the projection column 32. The said projection column 32 is set at the both sides of through-hole I 31. The sidewall of the said tie rod sleeve 26 is provided with reverse buckle 37 matched with projection column 32. Through the coordination of reverse buckle 37 with projection column 32, the said tie rod sleeve 26 is inserted at the top of external tie rod 25. The sidewall of the said tie rod sleeve 26 is provided with compression spring sheet 33 matched with through-hole I 31. The bottom end of the said tie rod 27 is slide-set inside external tie rod 25. Totally, two groups of the said limit sheet 29 are set and two groups of the said limit sheet 29 are inserted at the bottom of internal tie rod 27. The said internal tie rod plug 28 is set at the bottom end of internal tie rod 27 and the sidewall of the said internal tie rod plug 28 is provided with through-hole II 34 matched with through-hole I 31. The inside of the said internal tie rod plug 28 is provided with pellet head 35 and spring 36. The Spring 36 is set in the sidewall of internal tie rod plug 28. The other end of pellet head 35 is set at the terminal of spring 36. The said pellet head 35 is set in a corresponding with through-hole II 34. The said handle 30 is set at the top of internal tie rod 27.

The rotation angle of the tie rod V 21 is within 0~90° range.

At specific use, for expanding the frame, downwards compressing bottom frame support part 20 will deflect tie rod V 21 to a perfect level state and in turn will make two groups of front wheel unit part 1 and rear wheel unit part 2 mutually depart. Scissor structure I 4 and scissor structure II 5 are respectively connected at two groups of front wheel unit part 1 and two groups of rear wheel unit part 2. Front wheel unit part 1 and rear wheel unit part 2 at the same side are connected and fixed with the aid of side-wall connection structure 3 and in turn realizes a stable connection between front wheel unit part 1 and rear wheel unit part 2. For expanding tie rod 7, one may merely upwards pull handle 30. When limit sheet 29 touches tie rod sleeve 26, spring 36 will force pellet head 35 pass through-hole II 34 and insert inside through-hole I 31 and in turn interlock internal tie rod 27 with external tie rod 25. For retracting tie rod 7, one may merely downwards press compression spring sheet 33 to reject pellet head 35, i.e. retract internal tie rod 27 to external tie rod 25 again.

This utility model and its implementation modes are described in the above-mentioned pages and the description is not restrictive. What indicated in the attached diagrams are merely partial implementation modes of this utility model. The actual structures are not limited to the described ones. In general, similar structure modes and implementation examples made by common technicians in this field under this inspiration and non-deviating the creative aim of this utility model belong to the protection scope of this utility model.

What is claimed is:

1. A foldable frame for a cart, comprising a pair of front wheel unit parts, a pair of rear wheel unit parts, a pair of side-wall connection structures, a first scissor structure, a second scissor structure, a bottom support structure, a tie rod, and a tie rod connection support structure; the pair of front wheel unit parts and the pair of rear wheel unit parts are in identical structure; each of the front wheel unit parts comprises a column, a wheel clamp, a sliding sleeve and a moving wheel; the moving wheel is rotationally mounted at a bottom of the wheel clamp, and the column is mounted at a top of the wheel clamp; the sliding sleeve is slidably mounted on the column; two bottom ends of the first scissor structure are hinged at two bottom ends of the columns of the pair of front wheel unit parts respectively; two top ends of the first scissor structure are hinged at two sliding sleeves on the pair of front wheel unit parts respectively; the second scissor structure and the first scissor structure have the same structure; the second scissor structure is connected to the pair of rear wheel unit parts in a same manner as the first scissor structure is connected to the pair of front wheel unit parts; each of the side-wall connection structures is connected to one of the front wheel unit parts and a corresponding second wheel unit part positioned on a same lateral side of the foldable frame as said one of the front wheel unit parts is positioned; the bottom support structure is foldably connected to the pair of front wheel unit parts and the pair of rear wheel unit parts; the tie rod connection support structure is foldably connected to the columns of the pair of front wheel unit parts; and the tie rod is mounted at the tie rod connection support structure; each of the side-wall connection structures comprises a first connection rod, a second connection rod, a third connection rod, a fourth connection rod, a third scissor structure, a first support connector and a second support connector; one end of the first connection rod is hinged at a top of the column of a respective rear wheel unit part, and another end of the first connection rod is hinged at a first top end of the third scissor structure; one end of the second connection rod is hinged at a top of the column of a respective front wheel unit part, and another end of the second connection rod is hinged at a second top end of the third scissor structure; one end of the third connection rod is hinged at the sliding sleeve of the respective rear wheel unit part, and another end of the third connection rod is hinged at a first bottom end of the third scissor structure; one end of the fourth connection rod is hinged at the sliding sleeve of the respective front wheel unit part, and another end of the fourth connection rod is hinged at a second bottom end of the third scissor structure; one end of the first support connector is hinged at a bottom end of the column of the respective rear wheel unit part, and another end of the first support connector is hinged at a portion of the third scissor structure proximal to the first top end of the third scissor structure; one end of the second support connector is hinged at a bottom end of the column of the respective front wheel unit part, and another end of the second support connector is hinged at a portion of the third scissor structure proximal to the second top end of the third scissor structure.

2. The foldable frame for a cart of claim 1, wherein the bottom support structure comprises a bottom frame support part and four bottom tie rods; first ends of the four bottom tie rods are respectively hinged at four corners of the bottom frame support part respectively, and second ends of the four bottom tie rods are hinged at the bottom ends of the columns of the pair of front wheel unit parts and the pair of rear wheel unit parts respectively.

3. The foldable frame for a cart of claim 2, wherein the tie rod connection support structure comprises a tie rod connector, two support tubes and two tie rod support connectors; first ends of the two support tubes are hinged at two ends of the tie rod connector respectively; the two tie rod support connectors are rotary mounted at the bottom ends of the columns of the front wheel unit parts respectively; and the two tie rod support connectors are connected to second ends of the two support tubes respectively.

4. The foldable frame for a cart of claim 3, which is wherein the tie rod comprises an external tie rod, a tie rod sleeve, an internal tie rod, an internal tie rod plug, two limit sheets and a handle; the external tie rod mounted at the tie rod connector; and sidewalls at a top portion of the external tie rod are provided with a first through-hole and two projection columns; the two projection columns are provided on the external tie rod on both sides of the first through-hole, and sidewalls of the tie rod sleeve are provided with reverse buckles corresponding to the projection columns and a compression spring sheet corresponding to the first through-hole; through coordination between the reverse buckles and the projection columns, the tie rod sleeve is inserted at the top portion of the external tie rod; internal tie rod is slidably inserted into the external tie rod; the two limit sheets are provided at a bottom part of the internal tie rod; the internal tie rod plug is provided at a bottom end of the internal tie rod; a sidewall of the said-internal tie rod plug is provided with a second through-hole corresponding to the first through-hole; a pellet head and a spring is provided inside the internal tie rod plug; one end of the spring abuts against an inner sidewall of the internal tie rod plug, another end of the spring is connected to one end of the pellet head, and another end of the pellet head is biased by the spring to project through the second through hole and the first through hole when the tie rod is extended; the handle is provided at a top of the internal tie rod.

5. The foldable frame for a cart of claim 4, which is wherein the bottom tie rods are rotatable within a 0~90° range.

* * * * *